United States Patent
Eichen et al.

(10) Patent No.: US 11,765,154 B2
(45) Date of Patent: Sep. 19, 2023

(54) SECURELY PROVISIONING A SERVICE TO A CUSTOMER EQUIPMENT

(71) Applicant: Verizon Patent and Licensing Inc., Arlington, VA (US)

(72) Inventors: Elliot G. Eichen, Arlington, MA (US); Tim D. Paiement, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 528 days.

(21) Appl. No.: 15/219,732

(22) Filed: Jul. 26, 2016

(65) Prior Publication Data
US 2018/0034805 A1 Feb. 1, 2018

(51) Int. Cl.
*H04L 9/40* (2022.01)
*H04L 9/32* (2006.01)

(52) U.S. Cl.
CPC ........ *H04L 63/0823* (2013.01); *H04L 9/3263* (2013.01)

(58) Field of Classification Search
CPC ... H04L 9/3268; H04L 41/0803; H04L 12/66; H04L 65/1069; H04L 65/1073; H04L 63/102; H04W 12/06; H04W 4/16
See application file for complete search history.

(56) References Cited

U.S. PATENT DOCUMENTS

| | | | | |
|---|---|---|---|---|
| 8,139,564 B1* | 3/2012 | Weaver | ................... | H04W 4/16 |
| | | | | 370/352 |
| 8,195,819 B1* | 6/2012 | Delker | ................... | G06F 21/41 |
| | | | | 709/229 |
| 8,893,255 B1* | 11/2014 | Martini | ................. | H04L 67/306 |
| | | | | 726/12 |
| 9,270,454 B2* | 2/2016 | Maruti | .................. | H04L 9/0866 |
| 2006/0229931 A1* | 10/2006 | Fligler | ................... | G06Q 30/02 |
| | | | | 705/7.38 |
| 2008/0046735 A1* | 2/2008 | Nedeltchev | ......... | H04L 63/0892 |
| | | | | 713/173 |

(Continued)

OTHER PUBLICATIONS

Chau, S.Y., et al., 2017, May. Symcerts: Practical symbolic execution for exposing noncompliance in X. 509 certificate validation implementations. In 2017 IEEE Symposium on Security and Privacy (SP) (pp. 503-520). IEEE. (Year: 2017).*

(Continued)

*Primary Examiner* — Luu T Pham
*Assistant Examiner* — Edward X Long (57) ABSTRACT

A device may receive a certificate, such as an X.509 certificate, that includes authentication information. The authentication information may uniquely identify a customer equipment. The device may authenticate the customer equipment using the authentication information. The device may obtain configuration information, associated with configuring the customer equipment to receive a service, based on authenticating the customer equipment using the authentication information. The device may provide the configuration information to permit the customer equipment to be configured to receive the service. The device may provide the service to the customer equipment based on authenticating the customer equipment.

20 Claims, 5 Drawing Sheets

(56) References Cited

U.S. PATENT DOCUMENTS

| | | | | |
|---|---|---|---|---|
| 2009/0017790 A1* | 1/2009 | Thalapaneni | ....... | H04L 61/1594 455/410 |
| 2009/0268713 A1* | 10/2009 | Ottur | .................. | H04M 7/0069 370/352 |
| 2010/0226287 A1* | 9/2010 | Horvath | .............. | H04L 12/1822 370/260 |
| 2012/0179652 A1* | 7/2012 | Glaude | ............ | G06F 17/30581 707/626 |
| 2013/0151314 A1* | 6/2013 | Kugler | ................ | G06Q 30/016 705/7.32 |
| 2014/0134980 A1* | 5/2014 | Singh | ................ | H04W 12/084 455/411 |
| 2014/0215580 A1* | 7/2014 | Behringer | ............... | H04L 63/20 726/5 |
| 2014/0274121 A1* | 9/2014 | Raniere | .................. | H04W 4/02 455/456.1 |
| 2015/0188843 A1* | 7/2015 | Chauhan | ............... | H04L 47/801 709/225 |

OTHER PUBLICATIONS

Delignat-Lavaud, et al,, 2016, Cinderella: Turning shabby X. 509 certificates into elegant anonymous credentials with the magic of verifiable computation. In 2016 IEEE Symposium on Security and Privacy (SP) (pp. 235-254). IEEE. (Year: 2016).*

Wikipedia, "X.509," https://en.wikipedia.org/wiki/X.509, Jun. 19, 2016, 11 pages.

Wikipedia, "pcap," https://en.wikipedia.org/wiki/Pcap, Jun. 15, 2016, 4 pages.

Wikipedia, "HTTPS," https://en.wikipedia.org/wiki/HTTPS, Jul. 25, 2016, 9 pages.

Wikipedia, "Shared secret," https://en.wikipedia.org/wiki/Shared_secret, Jan. 2, 2015, 1 page.

* cited by examiner

SECURELY PROVISIONING A SERVICE TO A CUSTOMER EQUIPMENT

BACKGROUND

In cryptography, X.509 is an International Telecommunications Union Telecommunications Standardization Sector (ITU-T) standard for a public key infrastructure (PKI) to manage digital certificates and public key encryption. An X.509 certificate is a digital certificate that uses the X.509 PKI to verify that a public key belongs to a user, computer, or service identity included within the digital certificate. The X.509 certificate may be used to secure web and email communication, for example.

DETAILED DESCRIPTION OF PREFERRED EMBODIMENTS

The following detailed description of example implementations refers to the accompanying drawings. The same reference numbers in different drawings may identify the same or similar elements.

A network administrator may wish to configure a customer equipment, such as a telephone, a fax machine, or the like, to communicate via a network. Configuration may include entry of authentication information and/or loading of configuration information for the customer equipment. Unfortunately, the network administrator may have to manually enter the authentication information and/or load the configuration information, which may be error-prone, time-consuming, and/or may create security issues.

Implementations described herein utilize an X.509 certificate to authenticate a customer equipment. The certificate may include authentication information that uniquely identifies the customer equipment. Once authenticated, configuration information may be securely provided to the customer equipment. Additionally, authentication of customer equipment using the X.509 certificate permits customized and/or customer equipment-specific services to be provided to the customer equipment.

In this way, the need for a network administrator to manually configure the customer equipment may be reduced and/or eliminated, which may reduce errors associated with configuration of customer equipment, may save time, and may increase security for the network and/or the customer equipment. For example, utilizing an X.509 certificate to authenticate the customer equipment permits zero touch provisioning, configuration, and management of the customer equipment in a secure manner.

Figure 1A:
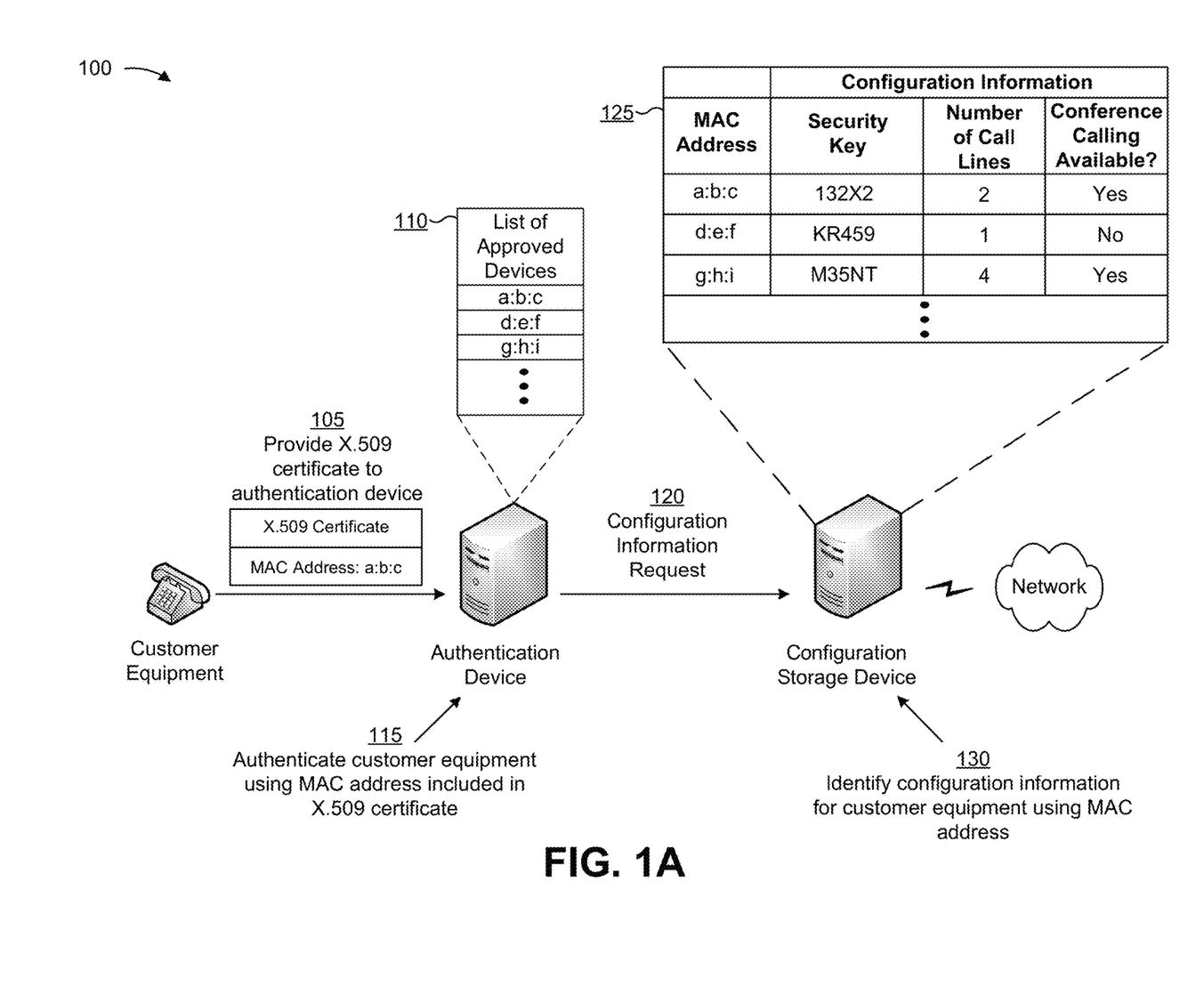
FIGS. 1A and 1B are diagrams of an overview of an example implementation described herein.
Figure 1B:
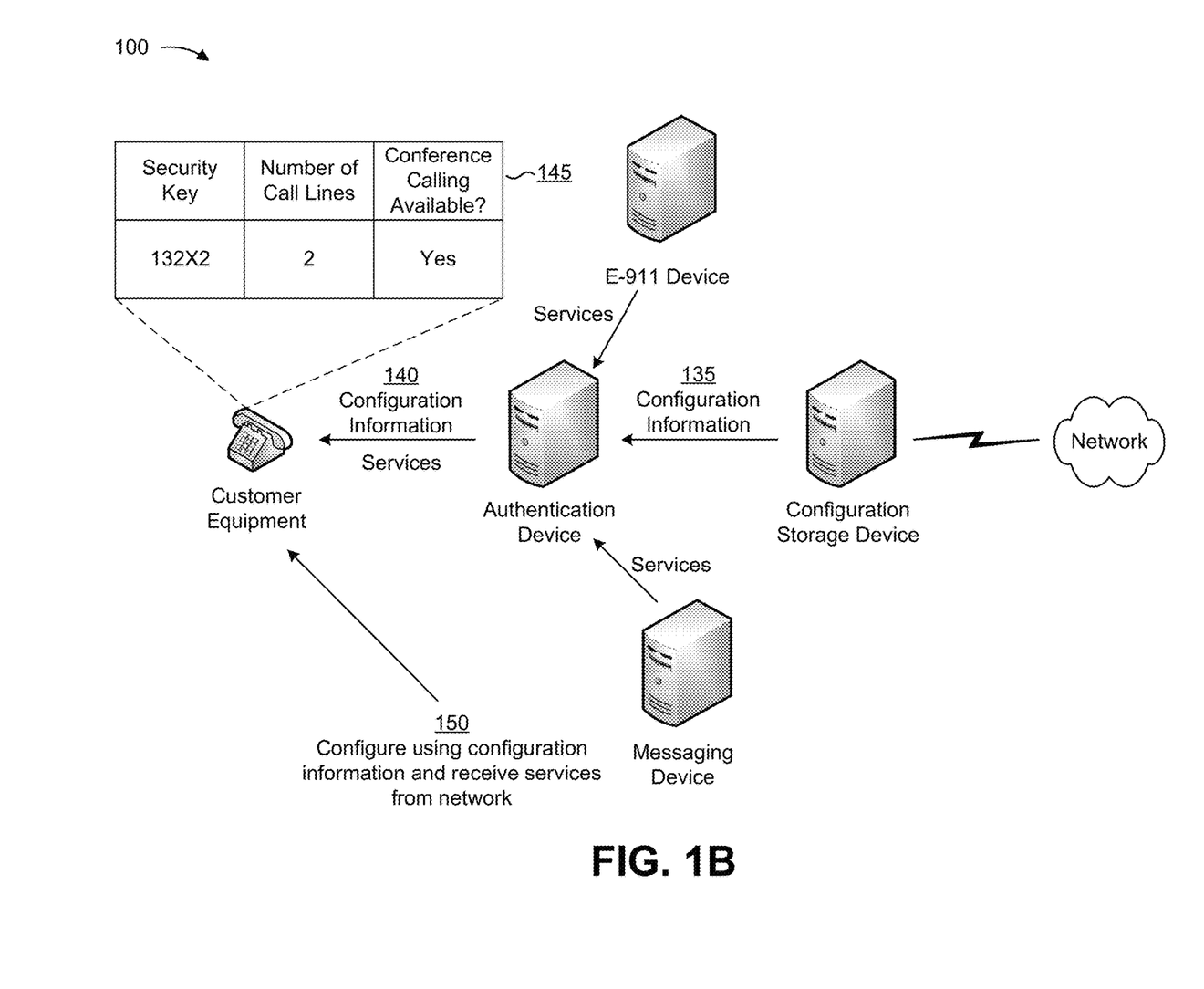

FIGS. 1A and 1B are diagrams of an overview of an example implementation 100 described herein. As shown in FIG. 1A, and by reference number 105, a customer equipment may provide an X.509 certificate to an authentication device. The X.509 certificate may include a media access control (MAC) address of the customer equipment. In example implementation 100, assume that the MAC address is a:b:c, as shown, and that the customer equipment provides the MAC address a:b:c to the authentication device.

As shown by reference number 110, the authentication device may store a list of approved devices. In example implementation 100, assume that the list of approved devices includes a device having the MAC address a:b:c, as shown. The authentication device may receive the X.509 certificate from the customer equipment.

As shown by reference number 115, the authentication device may authenticate the customer equipment using the MAC address (e.g., a:b:c) that is included in the X.509 certificate. For example, the authentication device may compare the MAC address received from the customer equipment to the list of MAC addresses stored by the authentication device. As shown by reference number 120, after authenticating the customer equipment, the authentication device may request configuration information from a configuration storage device. The configuration information may be associated with configuring the customer equipment, such as configuring the customer equipment to communicate with a network, configuring one or more services for the customer equipment, or the like.

As shown by reference number 125, assume that the configuration information stored by the configuration storage device includes a security key, a number of call lines, and an indication of whether conference calling is available for a particular MAC address, as shown. Assume further that the configuration information for the customer equipment having the MAC address a:b:c includes information that identifies a security key of 132×2, that two (2) call lines are available for the customer equipment, and that the customer equipment is available for conference calling, as also shown.

As shown by reference number 130, the configuration storage device may identify configuration information for the customer equipment having the MAC address a:b:c. For example, the configuration storage device may determine that the configuration information for the customer equipment having the MAC address a:b:c includes information identifying the security key of 132×2, that the customer equipment has the two (2) call lines available, and that the customer equipment is available for conference calling.

As shown in FIG. 1B, and by reference number 135, the authentication device may receive the configuration information from the configuration storage device. As shown by reference number 140, the authentication device may provide the received configuration information to the customer equipment to enable the customer equipment to be configured. As shown by reference number 145, the configuration information may include information identifying the security key of 132×2, that the customer equipment has the two (2) call lines available, and that the customer equipment is available for conference calling.

As shown by reference number 150, based on authentication of the customer equipment, the customer equipment may be configured using the configuration information, received from the authentication device, so that the customer equipment may receive customized and/or customer equipment-specific services from the network. For example, the customer equipment may receive services from an Enhanced 911 (E-911) device, such as E-911 services, and/or services from a messaging device, such as short message service (SMS) messaging services. The E-911 device and the messaging device may provide the services to the customer equipment via the authentication device.

In this way, an authentication device may automatically authenticate a customer equipment using an X.509 certificate and may configure the customer equipment based on authenticating the customer equipment. This reduces or eliminates the need for a network administrator to manually configure the customer equipment, thereby reducing errors, saving time, and increasing security. In addition, this enables secure and automatic provisioning of a service to the customer equipment based on authenticating the customer equipment, thereby increasing security when providing the service and/or conserving computing resources by reducing or eliminating the need to re-authenticate the customer equipment each time a service is provided to the customer equipment.

As indicated above, FIGS. 1A and 1B are provided merely as an example. Other examples are possible and may differ from what was described with regard to FIGS. 1A and 1B.

Figure 2:
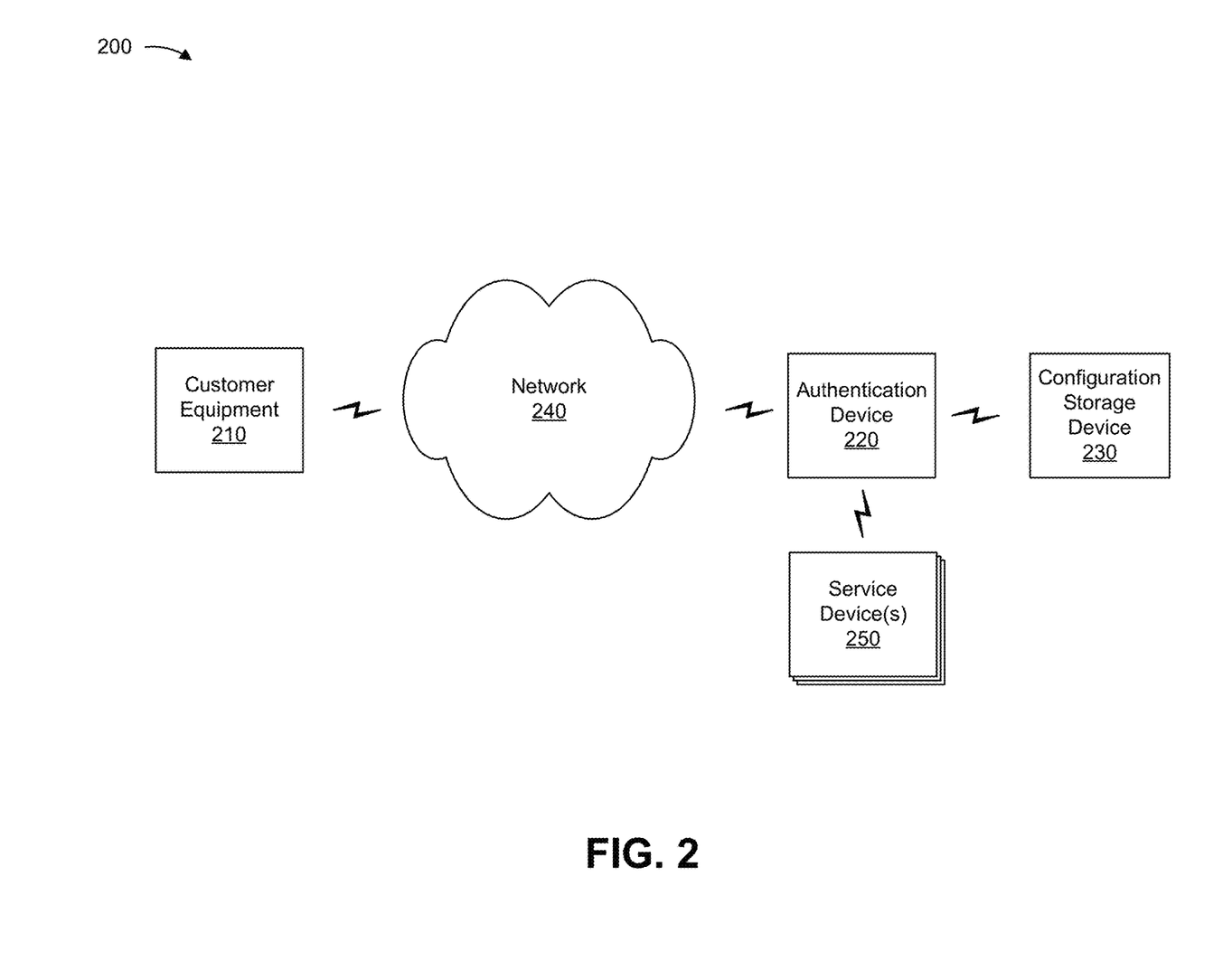
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a customer equipment 210, an authentication device 220, a configuration storage device 230, a network 240, and one or more service devices 250 (hereinafter referred to collectively as "service devices 250," and individually as "service device 250"). Devices of environment 200 may interconnect via wired connections, wireless connections, or a combination of wired and wireless connections.

Customer equipment 210 includes one or more devices capable of receiving and/or providing communications. For example, customer equipment 210 may include a telephone (e.g., a desk telephone, an internet protocol (IP) telephone, etc.), a fax machine, video conferencing equipment (e.g., a webcam or a display), a digital video recorder (DVR), a server, a computer, or a similar type of device. As another example, customer equipment 210 may include a network device, such as a router, a server (e.g., a proxy server, a web server, a host server, a storage server, a server in a data center or in a cloud computing environment, etc.), a switch, a firewall, a bridge, a hub, a gateway, a reverse proxy, or a similar type of device. As another example, customer equipment 210 may include a user device, such as a mobile phone (e.g., a smart phone or a radiotelephone), a laptop computer, a tablet computer, a wearable communication device (e.g., a smart wristwatch, an activity band, or a pair of smart eyeglasses), a gaming device, or a similar type of device.

In some implementations, customer equipment 210 may communicate with authentication device 220 to authenticate customer equipment 210, as described elsewhere herein. Additionally, or alternatively, customer equipment 210 may receive configuration information from configuration storage device 230 (e.g., via authentication device 220), and may be configured using the configuration information, as described elsewhere herein.

Authentication device 220 includes one or more devices capable of authenticating another device (e.g., customer equipment 210). For example, authentication device 220 may include a server device, such as a proxy server, an authentication, authorization, and accounting (AAA) server, a home subscriber server (HSS), or a similar type of device. Authentication device 220 may receive authentication information from customer equipment 210 and may authenticate customer equipment 210 based on the authentication information, as described elsewhere herein.

Configuration storage device 230 includes one or more devices capable of generating, receiving, storing, processing, or providing configuration information. For example, configuration storage device 230 may include a server (e.g., a configuration server), a group of servers (e.g., in a data center, in a cloud computing environment, etc.), or a similar type of device. In some implementations, configuration storage device 230 may receive a request for configuration information from authentication device 220 and may provide the configuration information to authentication device 220 based on the request, as described elsewhere herein.

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Service device 250 includes one or more devices capable of providing a service. For example, service device 250 may include a server, a group of servers, or a similar type of device. In some implementations, service device 250 may receive a request for a service from customer equipment 210 (e.g., via authentication device 220), as described elsewhere herein. Additionally, or alternatively, service device 250 may provide the service to customer equipment 210 based on the request, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
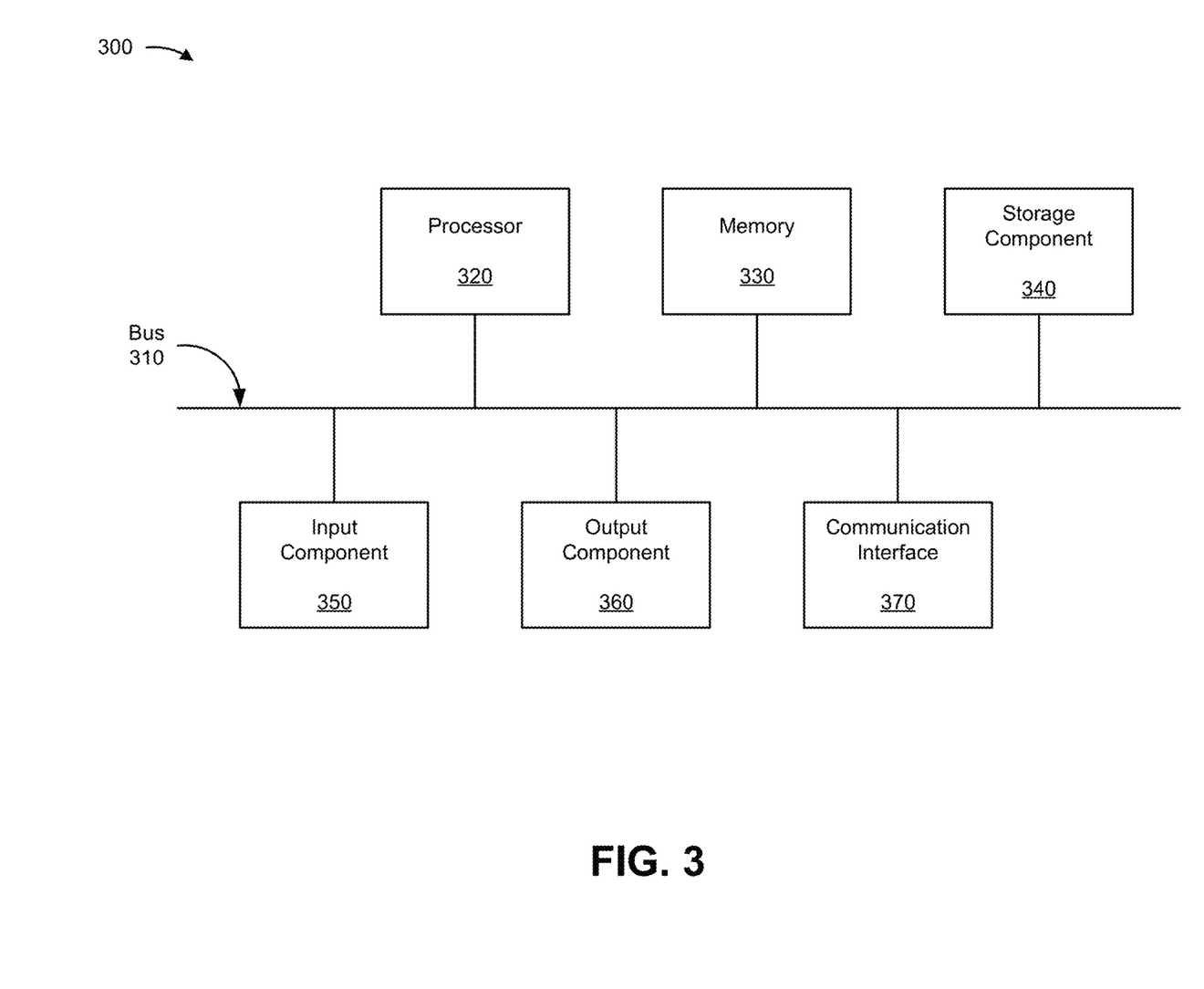
FIG. 3 is a diagram of example components of one or more devices of FIG. 2.

FIG. 3 is a diagram of example components of a device 300. Device 300 may correspond to customer equipment 210, authentication device 220, and/or configuration storage device 230. In some implementations, customer equipment 210, authentication device 220, and/or configuration storage device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
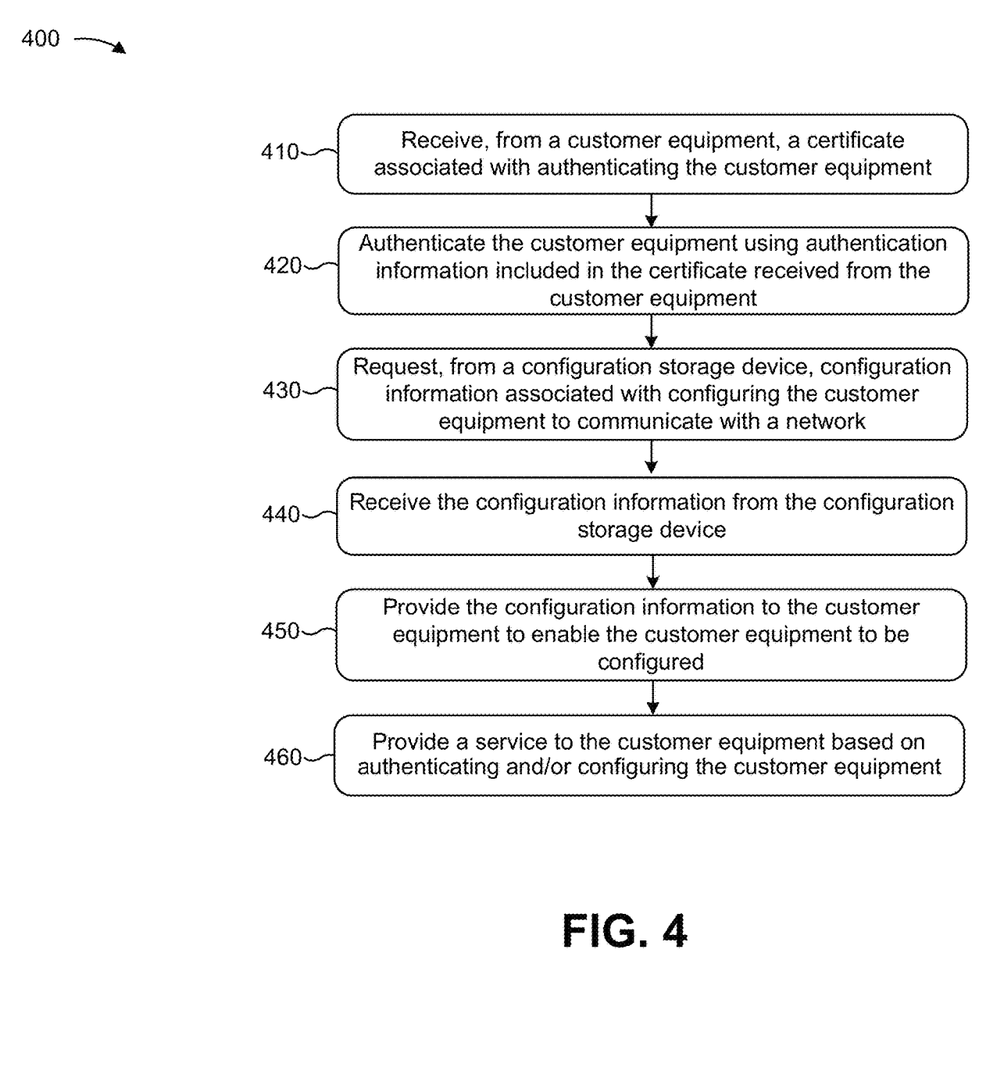
FIG. 4 is a flow chart of an example process for securely provisioning a service to a customer equipment.

FIG. 4 is a flow chart of an example process 400 for securely provisioning a service to a customer equipment. In some implementations, one or more process blocks of FIG. 4 may be performed by authentication device 220. In some implementations, one or more process blocks of FIG. 4 may be performed by another device or a group of devices separate from or including authentication device 220, such as customer equipment 210 and/or configuration storage device 230.

As shown in FIG. 4, process 400 may include receiving, from a customer equipment, a certificate associated with authenticating the customer equipment (block 410). For example, authentication device 220 may receive an X.509 certificate from customer equipment 210. In some implementations, the certificate may be associated with and/or stored by customer equipment 210.

In some implementations, the certificate may include authentication information associated with authenticating customer equipment 210. For example, the authentication information may include a MAC address that uniquely identifies customer equipment 210. As another example, the authentication information may include other information that uniquely identifies customer equipment 210, such as a serial number, an international mobile subscriber identity (IMSI), a universally unique identifier (UUID), or a globally unique identifier (GUID). As another example, the authentication information may include an integrated circuit card identifier (ICCID) (e.g., an ICCID associated with a subscriber identification module (SIM) card).

In some implementations, customer equipment 210 and authentication device 220 may connect using public and private keys. For example, customer equipment 210 and authentication device 220 may connect using hypertext transfer protocol secure (HTTPS). Additionally, or alternatively, customer equipment 210 and authentication device 220 may connect using a shared secret. For example, customer equipment 210 and authentication device 220 may connect using a shared secret associated with a SIM card of customer equipment 210 and stored, or known, by authentication device 220.

In some implementations, authentication device 220 may receive the certificate when customer equipment 210 powers on and/or boots up. For example, customer equipment 210 may store an instruction that causes customer equipment 210 to establish a communication session with and/or provide the certificate to authentication device 220 upon powering on or booting up. Additionally, or alternatively, authentication device 220 may receive the certificate based on a request by authentication device 220 for the authentication information. For example, authentication device 220 may periodically request that customer equipment 210 provide authentication information, in which case customer equipment 210 may provide the certificate to authentication device 220. As another example, authentication device 220 may request the certificate upon detecting a communication session with customer equipment 210. Additionally, or alternatively, authentication device 220 may receive the certificate based on an input by a user of customer equipment 210. For example, the user may cause customer equipment 210 to provide the certificate to authentication device 220 by interacting with customer equipment 210 (e.g., a display of customer equipment 210, an input component of customer equipment 210, or the like).

In some implementations, authentication device 220 may receive the authentication information without receiving the certificate. For example, authentication device 220 may receive authentication information that includes an ICCID from customer equipment 210, without receiving an X.509 certificate, such as when customer equipment 210 attempts to connect to authentication device 220 via a cellular or mobile network.

As further shown in FIG. 4, process 400 may include authenticating the customer equipment using authentication information included in the certificate received from the customer equipment (block 420). For example, authentication device 220 may authenticate customer equipment 210 using the MAC address included in the X.509 certificate received from customer equipment 210.

In some implementations, authentication device 220 may authenticate customer equipment 210 by comparing the authentication information included in the certificate and a set of authentication information stored by authentication device 220 (or distributed across multiple authentication devices 220). In some implementations, authentication device 220 may authenticate customer equipment 210 to determine whether the authentication information included in the certificate correctly identifies customer equipment 210. Additionally, or alternatively, authentication device 220 may authenticate customer equipment 210 to determine whether the authentication information included in the certificate indicates that customer equipment 210 has permission to access network 240. Additionally, or alternatively, authentication device 220 may authenticate customer equipment 210 to determine whether the authentication information included in the certificate matches authentication information stored by authentication device 220.

In some implementations, authentication device 220 may authenticate customer equipment 210 prior to permitting customer equipment 210 to access or receive configuration information from authentication device 220. Authenticating and/or verifying customer equipment 210 prior to configuring customer equipment 210 increases security associated with configuring customer equipment 210.

As further shown in FIG. 4, process 400 may include requesting, from a configuration storage device, configuration information associated with configuring the customer equipment to communicate with a network (block 430) and receiving the configuration information from the configuration storage device (block 440). For example, authentication device 220 may generate a request for the configuration information, using the authentication information, and may request the configuration information from configuration storage device 230. In some implementations, the configuration information may be associated with configuring customer equipment 210. For example, the configuration information may include one or more instructions for configuring customer equipment 210 (e.g., when the one or more instructions are executed by customer equipment 210 or a device associated with configuring customer equipment 210).

In some implementations, the configuration information may include information associated with configuring customer equipment 210 to communicate with network 240. For example, the configuration information may include one or more credentials for accessing network 240 (e.g., a username, a password, a security key, or the like). As another example, the configuration information may include one or more service configurations for customer equipment 210. In this case, the configuration information may indicate a quantity of call lines to be provided for customer equipment 210, whether customer equipment 210 is to be provided with a conference call service, whether customer equipment 210 is to be provided with a call forwarding service, or the like. As another example, the configuration information may include one or more customer preferences and/or account information (e.g., an account number, a contact list, or the like) associated with customer equipment 210.

As additional examples, the configuration information may include software, a software key, an application (e.g., an application to be installed or executed on customer equipment 210), a file, customer information (e.g., an account username and/or password, billing information, etc.), or the like. Additionally, or alternatively, the configuration information may include one or more instructions for use by customer equipment 210 to configure customer equipment 210, such as one or more instructions that direct customer equipment 210 to communicate directly with other devices of network 240 in order to configure customer equipment 210. Additionally, or alternatively, the configuration information may include a uniform resource identifier (URI), such as a uniform resource name (URN) or a uniform resource locator (URL), directing customer equipment 210 to a location where customer equipment 210 may obtain the configurations.

In some implementations, configuration storage device 230 may compare the authentication information received from authentication device 220 to a set of authentication information stored by configuration storage device 230 to determine which configuration information to provide to authentication device 220 when the comparison indicates a match. Based on the match, configuration storage device 230 may provide particular configuration information to authentication device 220. In some implementations, the particular configuration information provided to authentication device 220 for a first customer equipment 210 may differ from the particular configuration information provided to authentication device 220 for a second customer equipment 210 (e.g., based on a MAC address or another identifier associated with customer equipment 210 and/or included in the certificate).

In this way, authentication device 220 may request and receive customized configuration information for customer equipment 210. Thus, implementations described herein improve configuration of customer equipment 210 by enabling specific configurations to be provided to customer equipment 210 (e.g., rather than the same configuration being provided to all customer equipment 210).

In addition, implementations described herein conserve memory resources of configuration storage device 230 by reducing or eliminating the need for configuration storage device 230 to store configuration information that customer equipment 210 may not use, such as when the same configuration information is stored for all customer equipment 210 regardless of whether a particular customer equipment 210 needs the same configuration information as another customer equipment 210. Further, implementations described herein conserve network resources and computing resources of authentication device 220 by preventing authentication device 220 from providing configuration information to customer equipment 210 that customer equipment 210 may not use.

In some implementations, authentication device 220 may request a service from service device 250 based on authenticating customer equipment 210 (e.g., rather than or in addition to requesting configuration information from configuration storage device 230). For example, authentication device 220 may receive a certificate from customer equipment 210, may authenticate customer equipment 210 using the certificate, and may request a service related to an E-911 service or a local number portability service based on authenticating customer equipment 210. In some implementations, authentication device 220 may receive, from service device 250, information associated with providing the service (e.g., to provide the service to customer equipment 210, as described below).

As further shown in FIG. 4, process 400 may include providing the configuration information to the customer equipment to enable the customer equipment to be configured (block 450). For example, authentication device 220 may provide the configuration information to customer equipment 210 to enable customer equipment 210 to be configured. In some implementations, authentication device 220 may provide the configuration information to customer equipment 210 based on receiving the configuration information from configuration storage device 230. In some implementations, authentication device 220 may provide credentials to customer equipment 210 and/or configuration storage device 230 to enable customer equipment 210 to receive the configuration information directly from configuration storage device 230 (e.g., rather than receiving the configuration information from authentication device 220).

In some implementations, customer equipment 210 may use the configuration information to automatically configure customer equipment 210. For example, customer equipment 210 may use the configuration information to register with network 240, to communicate with network 240 to obtain a configuration for customer equipment 210, and/or to load or install a configuration based on information included in the configuration information. In this way, authentication device 220 may enable customer equipment 210 to be automatically and securely configured, thereby increasing efficiency and security of configuring customer equipment 210.

As further shown in FIG. 4, process 400 may include providing a service to the customer equipment based on authenticating and/or configuring the customer equipment (block 460). For example, authentication device 220 (or another device in network 240) may provide a service to customer equipment 210. In some implementations, authentication device 220 may provide the service to customer equipment 210 based on customer equipment 210 being configured.

In some implementations, the service provided to customer equipment 210 (e.g., by authentication device 220 or another device) may include a testing service and/or a support service. For example, authentication device 220 may extract system logs and/or packet capture (pcap) files to provide support services to customer equipment 210. The system logs and/or packet capture (pcap) files may be used to support testing in real time (e.g., as the system logs and/or pcap files are extracted) and/or for reporting and/or trending of the operation of customer equipment 210. As another example, a testing service may include remote testing of operational functionality of customer equipment 210. As another example, a support service may include a troubleshooting service to identify and/or repair a source of an operational problem with customer equipment 210.

Additionally, or alternatively, the service provided to customer equipment 210 may include synchronizing customer information and/or account information for a customer across multiple devices. For example, the service may include synchronizing a contact list on a first customer equipment 210 of a customer with a contact list on a second customer equipment 210 (e.g., synchronizing two mobile phones, two desk phones, a mobile phone with a desk phone, a desk phone with a mobile phone, etc.).

In some implementations, the service provided to customer equipment 210 may include a local number portability service. For example, the service may include permitting the phone number of customer equipment 210 to be transferred from a telephone network (e.g., the Public Switched Telephone Network (PSTN)) to a cloud computing network. As another example, the service may include permitting a first customer equipment 210 call to ring on a second customer equipment 210 that is associated with the first customer equipment 210 (e.g., permitting a mobile phone call to ring on another mobile phone, a desk phone call to ring on another desk phone, a desk phone call to ring on a mobile phone, a mobile phone call to ring on a desk phone, etc.).

Additionally, or alternatively, the service may include permitting a call of a first customer equipment 210 to be transferred to a second customer equipment 210 during a phone call. For example, the service may include permitting a mobile phone call to be transferred to another mobile phone, a desk phone call to be transferred to another desk phone, a desk phone call to be transferred to a mobile phone, a mobile phone call to be transferred to a desk phone, etc. during a phone call.

In some implementations, the service provided to customer equipment 210 may include a service related to Enhanced 911 (E-911). For example, the service provided to customer equipment 210 may connect emergency callers to public resources (e.g., police, fire fighters, ambulances, or the like). Additionally, or alternatively, authentication device 220 may securely request verification of the address (e.g., city, street name, building number, or the like) associated with a location of customer equipment 210, and/or may securely request an updated address associated with a location of customer equipment 210. In some implementations, the service provided to customer equipment 210 may be provided in real time (e.g., during use of customer equipment 210, as information associated with customer equipment 210 is gathered, etc.).

In some implementations, the service provided to customer equipment 210 may include a messaging service. For example, the service provided to customer equipment 210 may enable customer equipment 210 to receive messages, such as SMS messages. In some implementations, providing a messaging service to customer equipment 210 may enable control of customer equipment 210 via the use of messages. For example, providing the messaging service may enable natural language control of customer equipment 210 via the use of SMS messages.

In this way, authentication device 220 or another device may provide a customized service directly and/or automatically to customer equipment 210 based on authenticating and/or configuring customer equipment 210. In this way, implementations described herein enable secure provisioning of a service to customer equipment 210, thereby improving the provisioning of the service to customer equipment 210. In addition, implementations described herein conserve network resources and computing resources of authentication device 220 by reducing or eliminating the need for authentication device 220 to authenticate customer equipment 210 for each service that is provided to customer equipment 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable an authentication device to automatically authenticate a customer equipment and to automatically configure the customer equipment based on authenticating the customer equipment. This reduces or eliminates the need for a network administrator to manually configure customer equipment 210, thereby reducing errors, saving time, and/or increasing security associated with configuring the customer equipment. In addition, the authentication device may provide a service to the customer equipment based on authenticating the customer equipment. This enables zero touch provisioning, configuration, and/or management of customer equipment 210 in a secure manner.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   receive an X.509 certificate associated with authenticating a customer equipment,
      the X.509 certificate including a media access control (MAC) address of the customer equipment,
         the MAC address uniquely identifying the customer equipment;
   store a list of MAC addresses of approved devices;
   authenticate the customer equipment using the MAC address,
      the one or more processors, when authenticating the customer equipment, are to:
         compare the MAC address to the stored list of MAC addresses, and
         determine that the MAC address matches a MAC address of the stored list of MAC addresses;
   request customized configuration information, associated with configuring the customer equipment to communicate via a network, based on authenticating the customer equipment;
   receive the customized configuration information based on the MAC address,
      the customized configuration information specific to the customer equipment and being provided to the customer equipment and being different than configuration information associated with other customer equipment, and
      the customized configuration information identifying customer equipment- specific services and indicating an amount call lines to be provided for the customer equipment,
         the amount of call lines being two or more;
   provide the customized configuration information to the customer equipment to direct the customer equipment to communicate directly with other devices of the network in order to configure the customer equipment;
   extract one or more system logs,
      the one or more system logs comprise information used to provide a service to the customer equipment; and
   provide the service to the customer equipment based on the customized configuration information,
      the service provided to the customer equipment including a support service to identify an operational problem with the customer equipment by testing the customer equipment in real time as the one or more system logs are extracted.

2. The device of claim 1, where the one or more processors, when providing the service, are to:
   identify the service, of a set of services, using the MAC address received from the customer equipment; and
   provide the service to the customer equipment based on identifying the service.

3. The device of claim 1, where the service includes a service related to:
   synchronizing customer information or account information across multiple devices.

4. The device of claim 1, where the one or more processors, when requesting the customized configuration information, are to:
   generate a request for the customized configuration information using the MAC address; and
   request the customized configuration information based on generating the request for the customized configuration information.

5. The device of claim 1, where the customized configuration information includes:
   one or more credentials associated with permitting the customer equipment to access the network to obtain configurations.

6. A non-transitory computer-readable medium storing instructions, the instructions comprising:
   one or more instructions that, when executed by one or more processors, cause the one or more processors to:
   receive an X.509 certificate from a first device, the X.509 certificate being associated with permitting the first device to be configured, and
the X.509 certificate including a media access control (MAC) address of the first device,
the MAC address uniquely identifying the first device;
store a list of MAC addresses of approved devices;
authenticate the first device using the MAC address,
the one or more instructions, that cause the one or more processors to authenticate the first device, causing the one or more processors to:
compare the MAC address to the stored list of MAC addresses, and
determine that the MAC address matches a MAC address of the stored list of MAC addresses;
request, from a second device, customized configuration information, associated with configuring the first device to communicate with a network, based on authenticating the first device;
receive the customized configuration information from the second device based on the MAC address,
the customized configuration information specific to the first device and being provided to the first device and being different than configuration information associated with another device, and
the customized configuration information identifying customer equipment- specific services and indicating an amount of call lines to be provided for the first device,
the amount of call lines being two or more;
provide, to the first device, the customized configuration information to the first device to direct the first device to communicate directly with other devices of the network in order to configure the first device;
extract one or more system logs,
the one or more system logs comprise information used to provide a service to the first device; and
provide, to the first device, the service based on the customized configuration information,
the service provided to the first device including a support service to identify an operational problem with the first device by testing the first device in real time as the one or more system logs are extracted.

7. The non-transitory computer-readable medium of claim 6, where the one or more instructions, that cause the one or more processors to provide the service, cause the one or more processors to:
identify different sets of services to provide to different first devices; and
provide the different sets of services to the different first devices based on identifying the different sets of services.

8. The non-transitory computer-readable medium of claim 6, where the service is a first service, for the first device, and is different from a second service for the other device.

9. The non-transitory computer-readable medium of claim 6, where the customized configuration information includes an instruction that enables the first device to be configured.

10. The non-transitory computer-readable medium of claim 6, where the first device is a telephone, and the second device is a configuration storage device.

11. A method, comprising:
receiving, by a device, a certificate that includes a media access control (MAC) address,
the MAC address uniquely identifying a customer equipment;
storing, by the device, a list of MAC addresses of approved devices;
authenticating, by the device, the customer equipment using the MAC address,
where authenticating the customer equipment comprises:
comparing the MAC address to the stored list of MAC addresses, and
determining that the MAC address matches a MAC address of the stored list of MAC addresses;
obtaining, by the device, customized configuration information, associated with configuring the customer equipment to receive a service, based on authenticating the customer equipment,
the customized configuration information specific to the customer equipment and being provided to the customer equipment and being different than configuration information associated with other customer equipment, and
the customized configuration information identifying customer equipment- specific services and indicating an amount of call lines to be provided for the customer equipment,
the amount of call lines being two or more;
providing, by the device, the customized configuration information to the customer equipment to direct the customer equipment to communicate directly with other devices of a network in order to configure the customer equipment;
extracting, by the device, one or more system logs,
the one or more system logs comprise information used to provide the service to the customer equipment; and
providing, by the device, the service to the customer equipment based on the customized configuration information,
the service provided to the customer equipment including a support service to identify an operational problem with the customer equipment by testing the customer equipment in real time as the one or more system logs are extracted.

12. The method of claim 11, where providing the service comprises:
identifying the service associated with the MAC address; and
providing the service in real time based on identifying the service.

13. The method of claim 11, where the certificate is received from the customer equipment.

14. The method of claim 11, where obtaining the customized configuration information comprises:
providing the MAC address to a configuration storage device; and
receiving the customized configuration information based on providing the MAC address,
the customized configuration information including one or more files associated with configuring the customer equipment.

15. The method of claim 11, further comprising:
receiving one or more credentials from a configuration storage device,
the one or more credentials permitting the other customer equipment to communicate with the configuration storage device to obtain different configuration information; and
providing the one or more credentials to the other customer equipment.

16. The device of claim 1, where the X.509 certificate further includes one or more of:
   a serial number,
   an international mobile subscriber identity (IMSI),
   a universally unique identifier (UUID), or
   a globally unique identifier (GUID).

17. The non-transitory computer-readable medium of claim 6, where the customized configuration information includes one or more credentials associated with permitting the first device to access the network to obtain configurations.

18. The non-transitory computer-readable medium of claim 8, where the one or more instructions, that cause the one or more processors to receive the X.509 certificate, cause the one or more processors to:
   receive the X.509 certificate when the first device powers on.

19. The method of claim 11, where receiving the X.509 certificate, cause the one or more processors to:
   receiving the X.509 certificate when the customer equipment on.

20. The device of claim 1, where the customized configuration information indicating that the customer equipment is provided with a conference call service.

* * * * *